United States Patent [19]

Corbett

[11] Patent Number: 4,485,323
[45] Date of Patent: Nov. 27, 1984

[54] MONOLITHIC OSCILLATING CRYSTAL TRANSDUCER SYSTEMS

[76] Inventor: James P. Corbett, 923 Palermo Dr., Santa Barbara, Calif. 93105

[21] Appl. No.: 575,190

[22] Filed: Jan. 30, 1984

[51] Int. Cl.$^3$ .......................................... H01L 41/08
[52] U.S. Cl. .................................... 310/338; 310/328; 310/321; 310/361; 310/368; 310/366; 73/703; 73/763
[58] Field of Search ................ 310/328, 338, 339, 329, 310/366, 361, 321, 367, 368; 73/517 R, 763, 715, 717, 723, 753, 703

[56] References Cited

U.S. PATENT DOCUMENTS

| | | | |
|---|---|---|---|
| 3,541,849 | 11/1970 | Corbett | 310/338 X |
| 3,891,870 | 6/1975 | Corbett | 310/348 X |
| 4,020,448 | 4/1977 | Corbett | 310/348 X |
| 4,126,801 | 11/1978 | Corbett | 310/338 X |
| 4,130,624 | 12/1978 | Walker | 310/348 X |
| 4,144,747 | 3/1979 | Datwyler, Jr. | 310/338 X |
| 4,175,243 | 11/1979 | Corbett | 310/338 |
| 4,439,705 | 3/1984 | Corbett | 310/338 |

Primary Examiner—Mark O. Budd

[57] ABSTRACT

A force and pressure transducer comprises a plate-like crystal. Two separate portions of the crystal are maintained in oscillation at separate frequencies by a circuit. The force to be measured, is applied by a seating to a part of the crystal edge such that compression in one of the oscillating portions causes the frequency of that oscillating portion to change substantially whereas the frequency of the other portion changes only minimally.

In the past it has been difficult to manufacture crystals in which the frequency versus temperature response of each of the two oscillating portions was sufficiently well matched to permit the difference frequency between the portions to be used as the instrument output signal.

This invention resides in the application of a second fixed force by a spring via a seating to a second part of the crystal edge in such a way as to influence the frequency of oscillation of this second portion. In so doing the second seating can be adjusted to cause the frequency change due to temperature of the second oscillating portion to become as nearly as possible matched to the frequency versus temperature response of the first oscillating portion of the crystal thus providing a frequency change derived by computing the difference frequency between the two portions. This difference frequency forms the instrument output and responds only to the force applied to the instrument and not to the ambient temperature of the instrument.

12 Claims, 8 Drawing Figures

MONOLITHIC OSCILLATING CRYSTAL TRANSDUCER SYSTEMS

This invention relates to oscillating crystal force and pressure transducer systems of the type generally described in my U.S. Pat. No. 4,175,243 and depends upon the principles enunciated also in my U.S. Pat. Nos. 3,541,849; 3,891,870; 4,020,448; 4,067,241 and 4,126,801 also application Ser. No. 328,520.

Previous transducers have given excellent performance at a fixed temperature of operation and under some conditions of varying ambient temperature. The present invention describes a method of improving the performance of the transducer under a significantly wider range of temperature conditions than hitherto.

According to the present invention a force or fluid pressure transducer which may be similar in construction to that shown in my U.S. Pat. No. 4,175,243, FIG. 5. of which is reproduced again for reference in the present disclosure, comprises a single plate-like oscillating crystal which sits upright on a pair of seatings disposed on a base member which forms part of the transducer housing. Means are provided for transmitting a force to the crystal along the direction of the surface of said crystal so as to produce, in response to said force, a change of the resonant frequency of the crystal.

The force may originate from a fluid pressure to be measured, this pressure being supplied to a diaphragm which forms part of the transducer enclosure.

The crystal of my U.S. Pat. No. 4,175,243 has on it two oscillating portions. Heretofore, the temperature dependence of the operation of the instrument has been controlled by ensuring identical temperature behaviour of each of these two oscillating portions by careful control of the crystal manufacturing process. This procedure is, however, expensive and the present invention describes a method of adjustment to said required behaviour, i.e.; to ensure that the instrument output is independent of ambient temperature variations.

Reference will hereinafter be made to the accompanying drawings which illustrate various embodiments of the invention by way of example;

FIGS. 1, 2, and 3 represent prior art and are included to facilitate explanation.

Figure 1:
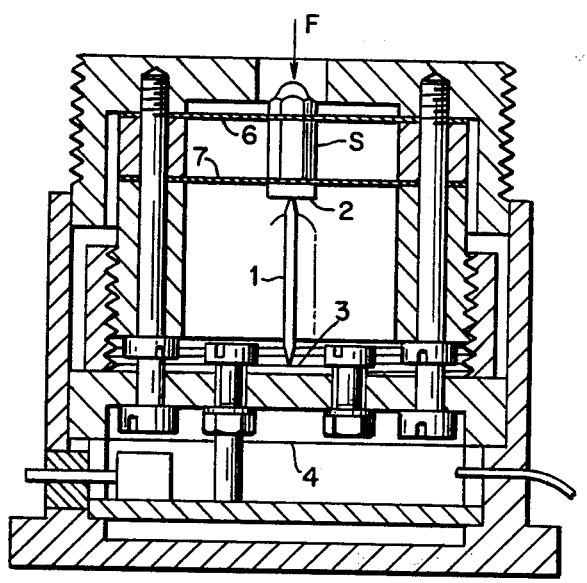
FIG. 1 shows a transducer housing a single crystal with a single oscillating portion supported between a pair of seatings.

Referring firstly to the prior art shown in FIG. 1. This figure is identical to FIG. 5 of my U.S. Pat. No. 3,891,870, wherein plate-like crystal 1 sits on seating 3 contained within a housing, base 4 being a part of said housing. Force F is applied to crystal 1 via a stem 5 this stem being guided by diaphragms or flat springs 6 and 7. Crystal 1 which may be circular has on each face an electrode, the electrodes being arranged to keep the crystal in oscillation.

It was shown in U.S. Pat. No. 3,891,870 that if the X-axis in a quartz crystal, which is a type well known in the quartz crystal industry and preferred in the present embodiment is set at a particular angle which may be substantially 40° to the line of the force applied between seatings 1 and 2, then the amount by which the frequency of oscillation of crystal 1 changes when the applied force F is changed, is independent of temperature changes of crystal 1.

Thus the change of frequency of the crystal in response to change of force F of the transducer is an accurate measure of force F of long as as the temperature of the crystal is constant. However, the crystal frequency itself changes substantially with temperature change and the resultant error is generally termed 'zero shift' in the transducer industry.

Figure 2:
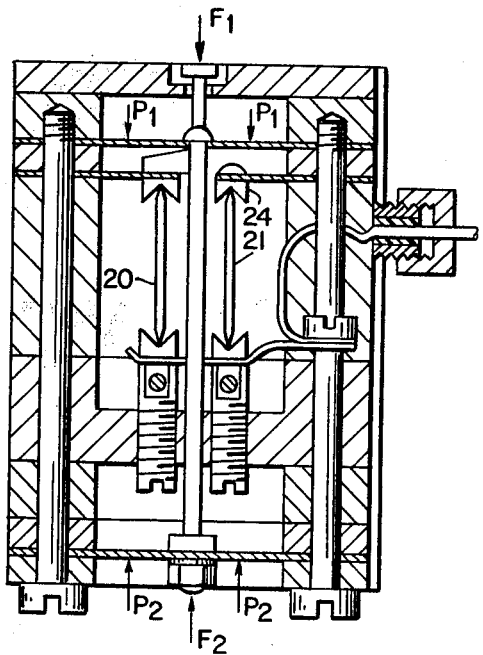
FIG. 2 shows a transducer housing dual crystals each with single oscillating portions, each crystal being supported between a pair of seatings.

To overcome this problem a second crystal having the same temperature behaviour was introduced in U.S. Pat. No. 4,020,448, FIG. 1 of which is reproduced by way of explanation as FIG. 2 of the present disclosure.

The second crystal 21 is clamped in close proximity to the force responsive crystal 20 by a leaf spring which applies a fixed downward clamping action to upper seating 24. The difference frequency between the two crystals is derived electronically and forms the output of the instrument.

Figure 3:
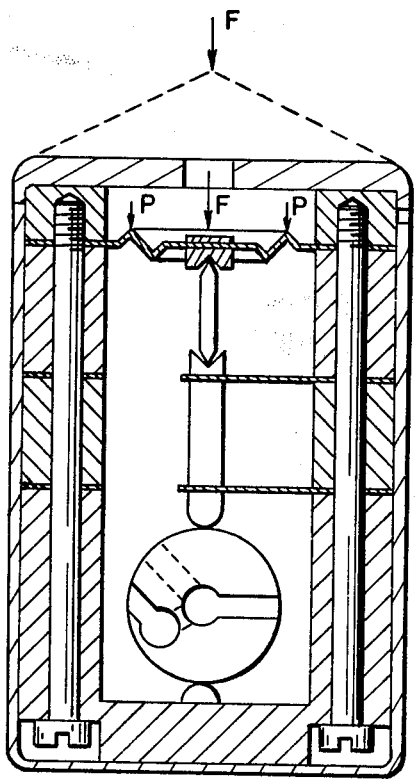
FIG. 3 shows a transducer housing a single crystal with two oscillating portions the crystal being supported between a pair of seatings.

Because a pair of crystals having the same temperature performance is employed, the performance of the transducer is considerably enhanced. Further, adjustment of the second crystal in rotation between its seats can effect additional reduction of zero shift but manufacturing inaccuracies in the transducer and transient thermal effect still leave residual errors. U.S. Pat. No. 4,175,243, FIG. 5 of which is reproduced as FIG. 3 in the present disclosure overcomes this problem to a large measure by providing two pairs of electrodes on a single oscillator plate.

Difficulty in matching persists because the force-responsive change in the difference frequency is not as large as is desired also any lack of parallelism in the crystal plate faces and variation in plating adherence brings about failure of the two frequencies to track one another identically when the crystal temperature changes.

The present disclosure overcomes the above difficiencies by firstly providing a significantly larger output frequency change from the transducer and secondly providing a means of adjusting for residual zero shift.

Figure 4:
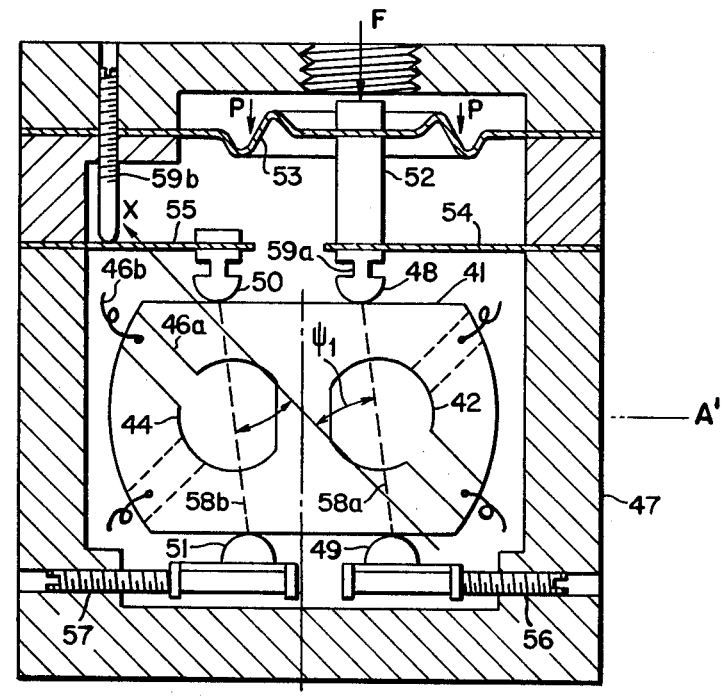
FIG. 4 shows a transducer housing a single crystal supported between two pairs of seatings.
Figure 5:
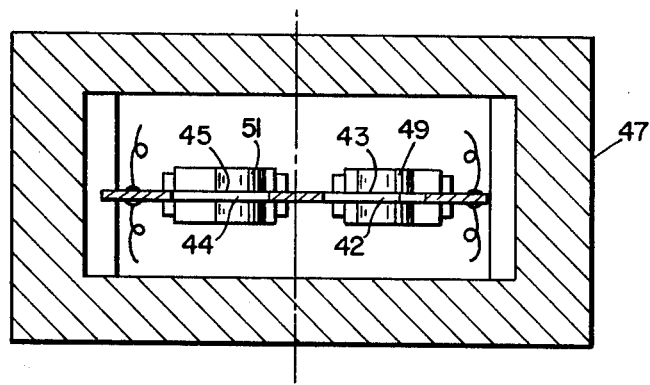
FIG. 5 shows a plan view on A A' of the transducer of FIG. 4.

FIGS. 4 and 5 show the way in which this further improvement is accomplished. Plate-like crystal 41 has an elongated configuration and has plated on its surfaces, two pairs of symmetrical disc-shaped electrodes 42 and 43 also 44 and 45 on opposing faces. Tabs such as 46a are connected away by wire 46b to integrated oscillator circuits, not shown. These maintain the two crystal portions between the electrodes 42 43, and 44, 45 in oscillation at the natural frequencies of oscillation in the quartz. These frequencies may be nearly identical due to the similarity of each oscillator but also may be spaced to a small extent from one another by adjustment to the electrodes plating thickness.

Crystal 41 is secured within housing 47 by seatings 48, 49 and 50,51. Force F, to be measured by the transducer, is transmitted to seating 48 by stem 52 the stem being guided by diaphragm 53 and leaf spring 54 such that the direction of the force application at the crystal edge is constrained to be normal to the edge.

Seating 50 is secured to end of leaf spring 55 snd the seating applies a downward force in a normal direction to the upper straight edge of crystal 41.

Seatings 49 and 51 are arranged to be laterally adjustable along the lower edge of crystal 41 by rotation of set-screws 56 and 57.

Figure 6:
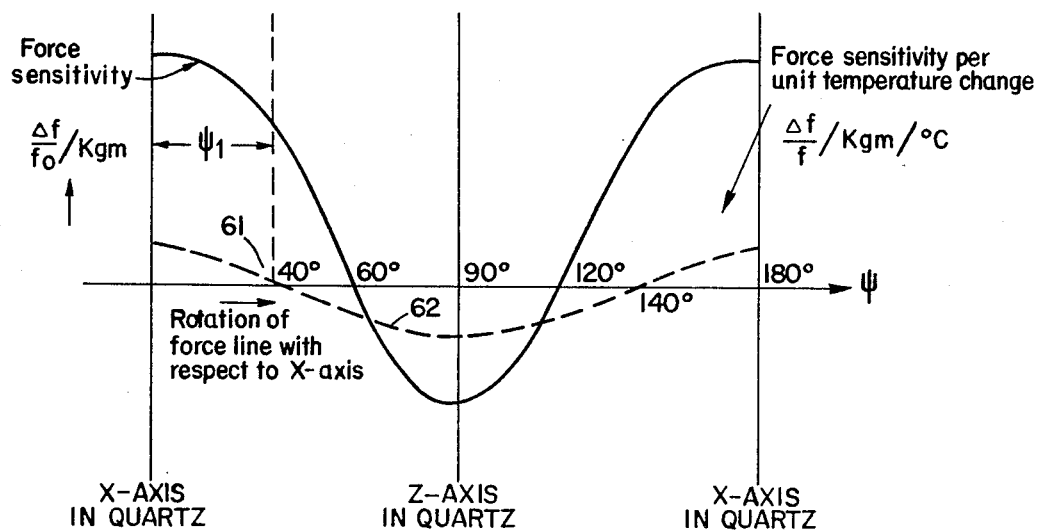
FIG. 6 shows a graph illustrating the force versus frequency dependence upon the angle of force application.

The line of force 58a between seatings 48 and 49 is arranged to be approximately across the center of the oscillating portion of crystal 41 which is between electrodes 42 and 43. As shown in U.S. Pat. No. 3,891,870 this line of force 58a is also arranged to be adjusted to an angle $\psi_1$, which is approximately 40° to the X-axis in crystal 41. The adjustment, achieved by rotation of screw 56, assures that the coefficient of the temperature dependency of the frequency-change-versus-applied-force F of the oscillating portion between seats 48 and 49, is zero. This is indicated at point 61 on curve 62 in FIG. 6 of the present disclosure.

The line of force between the seatings 50 and 51 is arranged to be approximately across the center of the oscillating portion of crystal 41 which is between electrodes 44 and 45 and the line of force 58b is adjusted by set screw 57 to cause the temperature-dependent behaviour of the two oscillating portions of crystal 41 to be matched such that the difference frequency between them will be independent of temperature changes of crystal 41.

Figure 7:
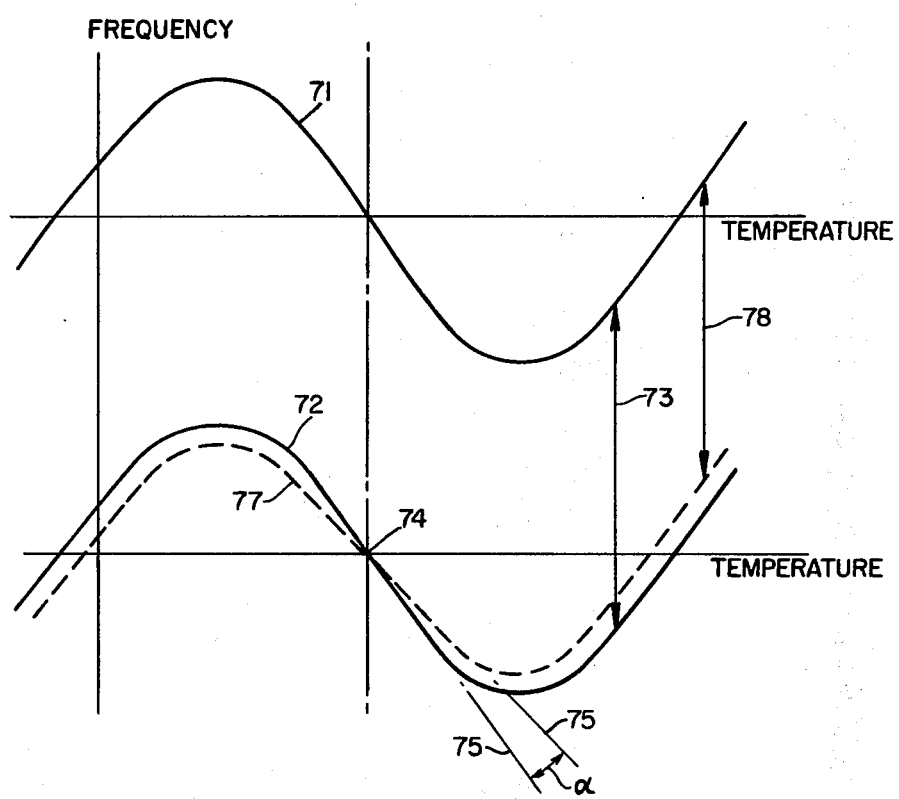
FIG. 7 shows a graph illustrating the principle of compensation of the transducer of FIGS. 4 and 5 for zero shift.

The way in which this matching is achieved is facilitated by reference to FIG. 7. Line 71 is a typical frequency versus temperature curve for an A T-cut quartz crystal. The oscillating portion of crystal 41 of FIGS. 4 and 5, which is between electrodes 42 and 43 would, for example, have a characteristic of this type.

Line 72 of FIG. 7 represents a similar, but not identical, characteristic of the oscillating portion of crystal 42 which is between electrodes 44 and 45 of FIG. 5. Curve 72 is spaced by small frequency 73 from curve 71 and has the same curvature as curve 71 but is rotated about point 74 by an angle $\alpha$ with respect to curve 71 as indicated by tangents 75 and 76 to curve 72 and 77 at point 74, curve 77 being a duplicate of curve 71. Difference frequency 73 which varies by a small amount with temperature, forms the instrument output.

Due to the preload applied by spring 55 and upper seat 50 on the crystal edge, variation of the lower seat position by set screw 57 changes the temperature behaviour 72 of the oscillating portion between electrodes 44 and 45 and has the effect of rotating curve 72 by angle $\alpha$ of FIG. 7. This results in a new behaviour of the crystal portion as indicated by dotted curve 77. Thus, suitable adjustment of curve 72 in this way can be arranged to cause curves 72 and 71 to "track" so that the difference frequency 78 between them remains substantially constant when the crystal temperature is changed, i.e., the zero shift of the instrumwnt is reduced to a negligible value.

It will be appreciated from the foregoing discussion that adjustment of the magnitude of the spring force of the cantilever spring 55 of FIG. 4 could also be arranged to effect the zero shift adjustment needed by rotating the angle $\alpha$ of FIG. 7. This may be accomplished by screw 59b in FIG. 4.

Figure 8:
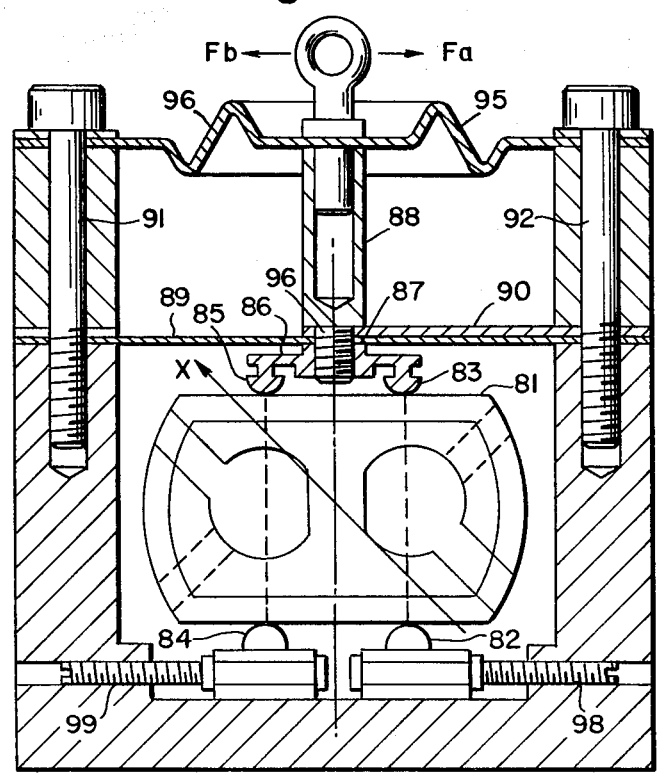
FIG. 8 shows a transducer housing a single crystal with two oscillating portions and four seatings the upper two of which are arranged on a rocker arm.

FIG. 8 shows an alternative arrangement of the transducer of FIGS. 4 and 5.

Crystal 81 of FIG. 8 is identical to crystal 41 of FIGS. 4 and 5. Lower seatings 82 and 84 are also identical and similarly adjustable to seatings 49 and 51 of FIGS. 4 and 5.

However, upper seatings 83 and 85 are located on beam 86 which is secured by screw 87 to stem 88. The lower part of stem 88 passes through a hole in diaphragm 89 and cantilever leaf spring 90 which are clamped by screws 91 and 92 to transducer housing 93. The upper part of stem 88 passes through a hole in bent leaf spring 94.

S-shaped bends 95 and 96 in leaf spring 94 allow a resultant force $F_a$-$F_b$ to be transmitted to upper seatings 83 and 85 on crystal 81 by pivoting of stem 88 about point 96 where it passes through diaphragm 89. For example, if $F_a$ exceeds $F_b$ then the force of seating 83 on crystal 81 will increase and the force of seating 85 on said crystal will be relieved.

Thus the difference in frequencies between the two oscillating portions of crystal 81 will increase.

Force sensitivity is adjusted to be independent of temperature by initially adjusting each seating pair 82, 83 and 84,85 to cause each oscillating portion to have force sensitivities independent of temperature change. Thereafter, lower seatings 82 and 84 are moved by equal distances either away from each other or towards each other as may be necessary to compensate for positive or negative zero shifts.

Because the force of seating 83 increases on crystal 81 when the force of seating 85 decreases, the total change in the difference frequency will be approximately twice as great as was the case with the transducer of FIGS. 4 and 5, However, zero shift of the crystal can still be adjusted to have the same small value. Thus, the arrangement of FIG. 8 has enhanced accuracy because the percentage zero shift error is reduced with respect to full scale instrument output.

A second advantage of the arrangement of FIG. 8 is that substantially larger full scale force can be sustained by the instrument because said full scale force is dependent upon the spring constant of leaf springs 90 and 94 and this can be made as large as desired.

It will be noted that the upper seatings 48, 50 and 83,85 in the arrangements of FIGS. 4, 5 and 8 have narrow sections, e.g., 59a in FIG. 4, connecting them to the member from which they receive their force. The reason for this is to allow a very small amount of rolling of the seating along the direction of the crystal edge. If such a provision is not made, then due to either changes in applied force to the transducer, or due to relative expansion of the transducer housing with temperature change, hysteresis effect will be present in the transducer output signal arising from frictional effects of the seatings at the crystal edge.

With respect to the arrangement of FIG. 4, reference was made to the effects of change of force F. It will of course be appreciated that change in fluid pressure P on diaphragm 53 could also equally well be measured.

In the arrangements of FIGS. 4, 5 and 8, the instruments' sensitivity to force, also their zero shifts have been described as being achieved by adjustment of the lower seatings. It would of course be possible to achieve the adjustment analogously by fixing the lower seatings and arranging for the upper seatings to be adjustable.

SUMMARY OF ADVANTAGES OVER EARLIER PATENTS

1. The ratio of electrodes diameter to length of force path is much lower and thus more favourable to larger frequency changes in response to force changes than was the case in U.S. Pat. No. 4,175,243. Frequency tracking when the temperature changes, is not impaired and thus becomes a much lower percentage of the full scale frequency change of the instrument with force, i.e., zero shift is substantially reduced.

2. The electrode arrangement is symmetrical (in U.S. Pat. No. 4,175,243 it was not). This gives better tracking of the two frequencies when the instrument temperature changes.

3. A positive means is provided to adjust matching of the temperature-dependent behaviour of the two oscillating portions of the crystal. Such means were not provided in U.S. Pat. No. 4,175,243.

4. The smaller size of the crystal gives rise to a more compact and robust transducer.

I claim:

1. A force transducer comprising;
   a plate-shaped piezo electric crystal having a peripheral edge,
   a first pair of electrodes disposed on corresponding regions on opposite sides of a first portion of the crystal,
   a second pair of electrodes disposed on corresponding regions on opposite sides of a second portion of the crystal,
   means for energising the electrode pairs to maintain oscillation of the first and second crystal portions at different frequencies,
   a first pair of seating members engaging the peripheral edge of the crystal and arranged to apply a force along a line extending through the first oscillating portion,
   a second pair of seating members engaging the peripheral edge of the crystal and arranged to apply a force along a line extending through the second oscillating portion,
   means for computing the difference frequency between the two oscillating portions and making this difference frequency available as the instrument output,
   the pairs of seating members being arranged in positions along the crystal periphery to cause the force of the instrument output to be independent of temperature changes of the instrument and further to cause the instrument output itself to be independent of temperature changes.

2. A force transducer according to claim 1 wherein the angles between the X-axis of said crystal and the lines of force between opposing pairs of seatings is substantially 40°.

3. A force transducer according to claim 1 including a rod like member engaging at least one of the seating members and arranged to transmit the force to be measured, to the crystal, said rod-like member being secured to the transducer housing by a diaphragm and a cantilever spring.

4. A force transducer according to claim 1 in which at least one of the seatings is made to bear upon the crystal edge with a preset force which is adjustable.

5. A force transducer according to claim 1 contained in a hermetically sealed housing.

6. A force transducer according to claim 1 wherein the seating members are curved at their points of contact with the crystal edges.

7. A force transducer according to claim 1 wherein the seating members are arranged to roll along the crystal edge.

8. A force transducer according to claim 1 wherein a single oscillator circuit is arranged to excite each of the two oscillating portions of the crystal alternately.

9. A force transducer according to claim 1 wherein the change of frequency of one oscillating portion when the temperature changes, is matched to the corresponding frequency change of the other oscillating portion by securing or removing one or more small mass loads at the crystal surfaces in close proximity to the electrodes on those surfaces.

10. A force transducer according to claim 1 which may be employed to measure its own acceleration by having a mass secured to it and arranging the mass to transmit the resulting inertial force changes to the force measurement point of the transducer.

11. A force transducer according to claim 1 arranged to measure the difference between two forces.

12. A force transducer according to claims 1 and 3 arranged to measure a substantially larger force than that sustained by the crystal by arranging the larger force to be sustained by a substantial spring secured to, or part of, the transducer housing and for said substantial spring to be connected by a rigid member to one or both of the cantilevers or diaphragms.

* * * * *